United States Patent
Cao et al.

(10) Patent No.: US 7,837,877 B2
(45) Date of Patent: Nov. 23, 2010

(54) PROCESS FOR SEPARATING COMPONENTS OF A MULTI-COMPONENT FEED STREAM

(75) Inventors: Wei Cao, Orefield, PA (US); Vladimir Yliy Gershtein, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1008 days.

(21) Appl. No.: 11/450,666

(22) Filed: Jun. 9, 2006

(65) Prior Publication Data

US 2007/0284306 A1 Dec. 13, 2007

(51) Int. Cl.
*B01D 15/00* (2006.01)
*B01D 53/22* (2006.01)
*B01D 59/12* (2006.01)

(52) U.S. Cl. .................. 210/640; 210/502.1; 96/45; 96/52

(58) Field of Classification Search .................. 210/640, 210/195.2, 502.1; 95/45, 46, 50, 52; 96/4, 96/6
See application file for complete search history.

(56) References Cited

U.S. PATENT DOCUMENTS

| | | | |
|---|---|---|---|
| 4,316,774 A | 2/1982 | Trusch | |
| 4,659,343 A * | 4/1987 | Kelly | 95/46 |
| 4,788,043 A | 11/1988 | Kagiyama et al. | |
| 4,879,041 A | 11/1989 | Kurokawa et al. | |
| 4,900,402 A | 2/1990 | Kaschemekat et al. | |
| 4,962,270 A | 10/1990 | Feimer et al. | |
| 5,051,188 A | 9/1991 | Spiske et al. | |
| 5,059,374 A * | 10/1991 | Krueger et al. | 264/156 |
| 5,108,549 A | 4/1992 | Wenzlaff et al. | |
| 5,334,314 A * | 8/1994 | Neel et al. | 210/640 |
| 5,512,179 A | 4/1996 | Bruschke et al. | |
| 5,538,640 A * | 7/1996 | Wijmans et al. | 210/640 |
| 5,552,179 A * | 9/1996 | Ramun | 427/136 |
| 5,554,286 A * | 9/1996 | Okamoto et al. | 210/500.25 |
| 5,976,324 A * | 11/1999 | Groschl et al. | 203/14 |
| 6,032,484 A * | 3/2000 | Chernyakov et al. | 62/624 |
| 6,117,328 A | 9/2000 | Sikdar et al. | |
| 6,224,763 B1 * | 5/2001 | Feng et al. | 210/232 |
| 6,387,269 B1 * | 5/2002 | Eltner et al. | 210/640 |

FOREIGN PATENT DOCUMENTS

| | | |
|---|---|---|
| EP | 0 226 216 A2 | 6/1987 |
| EP | 0 284 052 A2 | 9/1988 |
| EP | 0 428 022 A1 | 5/1991 |
| EP | 1864708 A1 * | 12/2007 |
| JP | 61-018406 | 1/1986 |
| JP | 62-144702 A | 6/1987 |
| JP | 63-305917 A | 12/1988 |
| JP | 03-089922 | 4/1991 |
| JP | 2005-066473 A | 3/2005 |
| WO | 92/19359 A1 | 11/1992 |

* cited by examiner

*Primary Examiner*—Ana M Fortuna
(74) *Attorney, Agent, or Firm*—Lina Yang

(57) ABSTRACT

Provided is a process and apparatus for separating a multi-component feed stream wherein a porous separator is used to effectively create, via permeation and phase change, at least three fractions of differing compositions.

8 Claims, 4 Drawing Sheets

PROCESS FOR SEPARATING COMPONENTS OF A MULTI-COMPONENT FEED STREAM

BACKGROUND OF THE INVENTION

The present invention relates to a process for separating a multi-component feed stream into fractions and apparatus for achieving the same. More specifically, the present invention relates to a process and apparatus which includes the use of a porous separator to separate a multi-component feed stream into fractions which contain relatively high concentrations of one or more of the components.

Numerous techniques are known for separating and recovering from a multi-component feed stream the individual components comprising the stream. Examples of such techniques include distillation, porous membrane separation, centrifugal separation, entrainment or impingement separation, and nonporous electrostatic membrane separation. Typically, these techniques are used separately for different types of applications and they are conducted in different types of equipment.

For example, U.S. Pat. No. 6,032,484 (Chernyakov), which is assigned to the same assignee as the present invention, describes a method for the separation and recovery of fluorochemicals from a gas stream containing a diluent gas and fluorochemicals by first contacting the gas stream with a system of membranes in one or more stages in which the membranes are selectively more permeable to the diluent gas than the fluorochemicals to provide a stream rich in the diluent gas and a stream rich in the gaseous fluorochemicals. Each resulting gaseous stream is purified subsequently in a separate step by use of distillation or adsorption to produce a stream highly enriched in the fluorochemicals and a stream highly enriched in the diluent gas.

The use of membrane separation and phase change techniques in combination with processes such as vacuum membrane distillation (VMD) and pervaporation are known also. VMD systems utilize a membrane-based process for extracting low concentrations of volatile organic compounds (VOCs) from a solvent such as water by partial vaporization through a polymeric membrane. The membrane acts as a selective barrier between the feed in the liquid phase and the vapor which permeates the membrane.

An example of a VMD process is described in the abstract of JP 3089922. According to this publication, a method is provided to separate a dissolved volatile substance from a feed stream by bringing the feed stream into contact with an inflow side of a porous separator, such as a hydrophobic porous membrane, and contacting an outflow side of the porous separator with an aqueous "recovery" solution. As the feed stream contacts the membrane, the component to be separated evaporates and forms a gaseous layer adjacent to the membrane. The component in gaseous form then enters the inflow side of the separator, diffuses though the separator, and exits the separator at the separator's outflow side. As the gaseous component exits the separator, it is absorbed into an aqueous recovery solution which is maintained at lower temperature than the feed stream. Thus, according to the process taught by this publication, the component to be separated does not undergo a phase change as it flows through the separator.

Another example of VMD is described in the abstract of JP 61018406. According to this publication, a feed liquid is brought into contact with a porous liquid-impermeable membrane and is then heated causing certain components of the feed to evaporate. The evaporated vapor permeates the membrane and enters a vapor-collecting space where it is condensed. Like JP 3089922, this publication teaches a process in which the component to be separated does not undergo a phase change as it flows through the separator.

In contrast to VMD processes, pervaporation involves the use of a membrane that functions as a selective barrier between the two phases, a liquid feed/retentate phase feed and a vapor phase permeate. The membrane allows the desired component(s) of the liquid feed to transfer through it by vaporization. This separation is mainly due to differences in polarity and not to the volatility difference of the components in the feed.

An example of a pervaporation process is found in U.S. Pat. No. 4,788,043 (Kagiyama) which describes a process for cleaning a semiconductor substrate with an organic solvent. As the substrate is cleaned, the organic solvent becomes contaminated with water, electrolytes and particulates. The solvent is purified by a two-step process involving a first pervaporization step, followed by a separate and independent distillation step. During the pervaporization step, the liquid solvent/water mixture is transferred through a pervaporator to remove a majority of water and other impurities from the solvent. More specifically, a majority of the solvent permeates a membrane of the pervaporator, while a majority of the water does not. The solvent that permeates through the membrane is then transferred to a separate device that removes an additional amount of water from the solvent via distillation. Thus, Kagiyama does not teach the use of a separator alone to effectively separate the components of a multi-component feed stream via permeation and creation of vapor and liquid permeant fractions.

A pervaporation process is also described in U.S. Pat. No. 4,900,402 (Kaschemekat) which discloses the separation of at least one component from a mixture of liquids, for example, separating ethanol from a fermentation mass by use of a first pervaporation device to form a first permeate vapor enriched in the component to be separated and (b) fractionating the first permeate vapor, for example, by temperature condensation, in a fractionating condenser to form a high concentration fraction twice enriched in the component to be separated. According to Kaschemekat, the mixture to be separated is subjected to a phase change (from liquid to vapor) as it permeates the membrane of the pervaporator. The vapor composition exiting the pervaporator is rich in ethanol. The enriched vapor is transferred to a condenser in which at least a portion of the water vapor is condensed into liquid and subsequently removed. While Kaschemekat teaches a process that utilizes a membrane to separate a multi-component feed stream via permeation and that the material permeating the membrane undergoes a phase change, it does not teach the use of a membrane alone to effectively separate the components of a multi-component feed stream via permeation and creation of vapor and liquid permeant fractions.

A multi-stage pervaporation process that utilizes multiple membranes in series and that is performed at progressively higher vacuum, higher temperature, or both, at each successive retentate stage is disclosed in U.S. Pat. No. 4,962,270 (Feimer). This process is described as being useful for separating components whose boiling temperatures vary over a wide range. Feimer is similar to Kaschemekat in that both teach a process for separating a multi-component feed via a pervaporator and a condenser. However, Feimer also teaches that multiple pervaporators and condensers may be used in series to form a plurality of process streams.

Other examples of pervaporation can be found, for example, in U.S. Pat. No. 5,108,549 (Wenzloff).

In each of the above-mentioned disclosures, the pervaporation or VMD step is not closely integrated with any other purification or separation processes. That is, the pervaporator only separates a multi-component feed stream via permeation. Thermodynamic separation (e.g., distillation) is taught as a discrete step which is performed in a separate piece of equipment.

BRIEF SUMMARY OF THE INVENTION

In accordance with this invention, there is provided a process for separating a multi-component feed stream into fractions comprising the steps of:

(a) providing a feed stream having at least two fluid components in the same phase;

(b) providing a porous separator having an inflow side and an outflow side;

(c) maintaining across the porous separator a pressure differential comprising a relatively high pressure on the inflow-side of the separator and a relatively low-pressure on the outflow side of the separator;

(d) bringing the feed stream at the relatively high pressure into contact with the inflow-side of the separator and under conditions which effect separation of the components of the feed stream into a re entate which forms on the inflow-side of the separator and a permeant fraction which: (i) forms on the other side of the inflow-side of the separator; (ii) includes more than one component of the feed stream in a proportion different from that of the feed stream being treated; and (iii) is the source of a liquid permeant fraction and vapor permeant fraction; and (e) recovering each of said retentate, liquid permeant fraction, and vapor permeant fraction.

In one exemplary embodiment of the present invention: (A) the feed stream comprises preferably a mixture of liquid components which may contain optionally one or more vapor components; (B) the nature of each of the porous separator and the components comprising feed stream is such that: (i) some of a plurality of the components permeate the separator as they travel from a high-pressure environment to a low-pressure environment; (the permeant fraction which comprises the components in a proportion different from that of the feed stream); and (ii) some of a plurality of the components do not permeate the separator (the retentate) by virtue, for example, of the relative sizes of the pores of the separator and the molecular sizes of the components; and (C) the components of the permeant fraction are separated under conditions in which at least one of the components undergoes a phase change, for example, by flashing to a vapor (the vapor permeant fraction), and separates via gravity from one or more liquid components which permeate the separator and remain in the liquid state (the liquid permeant fraction).

An important aspect of the present invention is the creation and maintenance of conditions which are effective in producing a permeant fraction which comprises one or more components in a liquid phase and one or more components in a vapor phase, with the composition comprising each phase being different one from the other. For example, pressure conditions in the porous separator and the outflow side of the porous separator are maintained to cause flashing of at least one of the liquid components of the permeant fraction or to cause condensing of at least one of the vapor components of the permeant fraction. The resulting vapor permeant fraction and liquid permeant fraction can be separated by gravity and then recovered. Accordingly, the process of the present invention can be operated efficiently and effectively to substantially simultaneously separate one fraction of a multi-component feed stream from another fraction thereof while also separating the other fraction into two different fractions; and this can be accomplished effectively by the use only of the proper pressure differential across the porous separator.

Another aspect of the present invention is the provision of a module which is capable of being used for separating into fractions a multi-component feed stream which contains at least two fluid components in the same phase and in predetermined amounts and which comprises:

(A) a first pressure chamber having an inlet for receiving the feed stream and an outlet for emitting a portion of the feed stream;

(B) a second pressure chamber;

(C) a porous separator which: (i) is positioned between the first and second pressure chambers; (ii) has a inflow side for receiving said feed stream and an outflow side in communication with said second pressure chamber; and (iii) is adapted to permit passage from the inflow side to the outflow side of but a portion of the fluid components of the stream and in amounts different from said predetermined amounts;

(D) means for maintaining the pressure in the first pressure chamber at a higher value than the pressure in the second pressure chamber to thereby establish a pressure differential across the porous separator;

(E) a vapor outlet in the second pressure chamber through which vapor in the chamber can be removed; and (F) a liquid outlet in the second pressure chamber through which liquid in the chamber can be removed.

As described in detail below, another aspect of the present invention is the provision of an apparatus that comprises a plurality of modules of the type described above and that can be used to provide fractions of the feed stream that are enriched in one or more components of the feed stream.

DETAILED DESCRIPTION OF THE INVENTION

Figure 1:
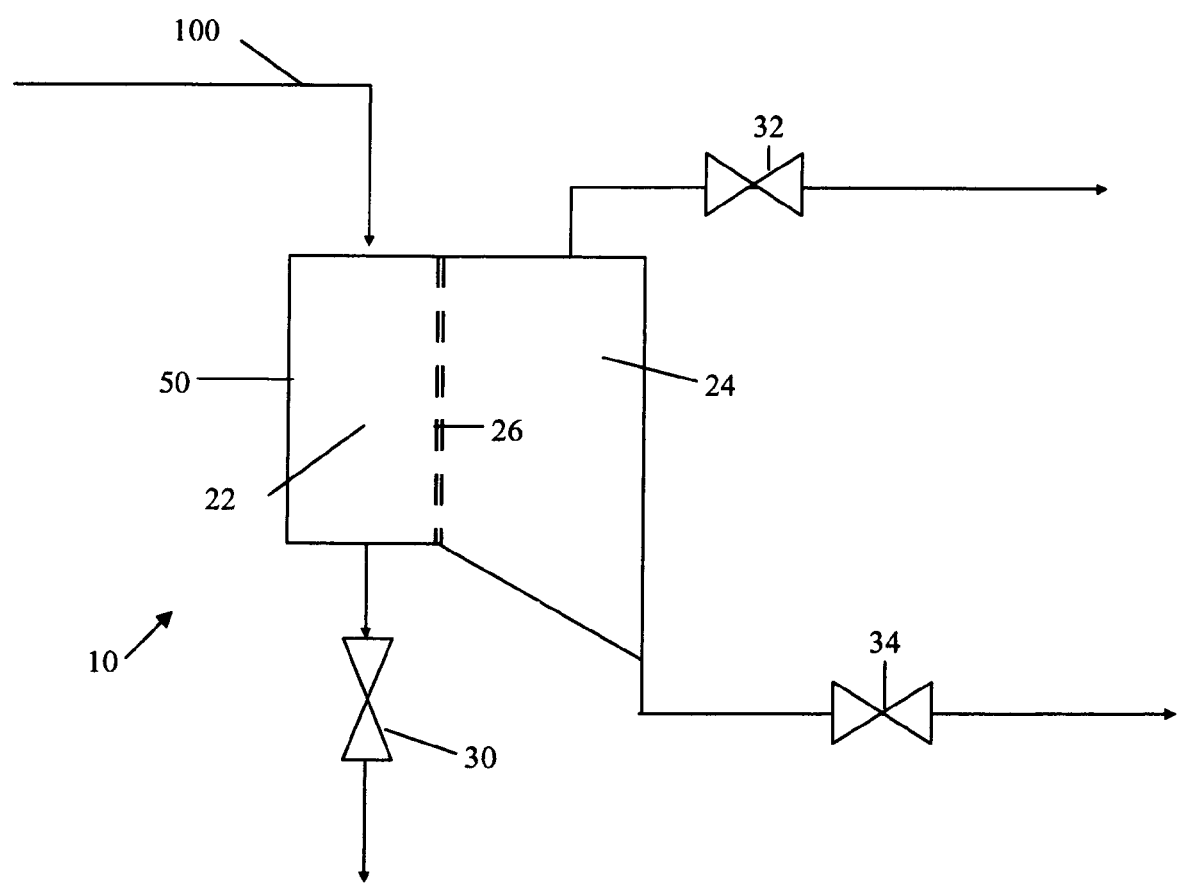
FIG. 1 shows a preferred embodiment of an apparatus according to the present invention.

An exemplary apparatus for use in separating a multi-component feed stream into fractions in accordance with the present invention is described herein. Reference is made to FIG. 1 which is illustrative of a preferred embodiment of the invention and which shows an apparatus 10 for separating a multi-component feed stream 100 into different fractions. The apparatus 10 comprises a single module 50 in which the feed stream is separated into fractions comprising components of the stream. The module 50 includes a high-pressure chamber 22 separated from a low-pressure chamber 24 by a porous separator 26, the nature of which (for example, pore size) is dependent on components of the stream to be separated. The pressure inside the high-pressure chamber is controlled by valve 30. The porous separator 26 is permeable to at least two components of the feed stream 100. The low-pressure chamber 24 is maintained at a pressure that is less than the pressure of the high-pressure chamber 22. (Accordingly, there is a pressure differential across the porous separator 26.) The pressure of the low-pressure chamber 24 is controlled by valve 34 and valve 32. The use of the terms "high-pressure" and "low-pressure" are not intended to be descriptive of the absolute values of the pressures, that is, whether the pressures are indeed above or below atmospheric pressure. The terms are used exclusively in a relative sense to characterize the one chamber as having a pressure higher than the pressure of the other chamber so as to account for the pressure differential across the porous separator 26.

Figure 2:
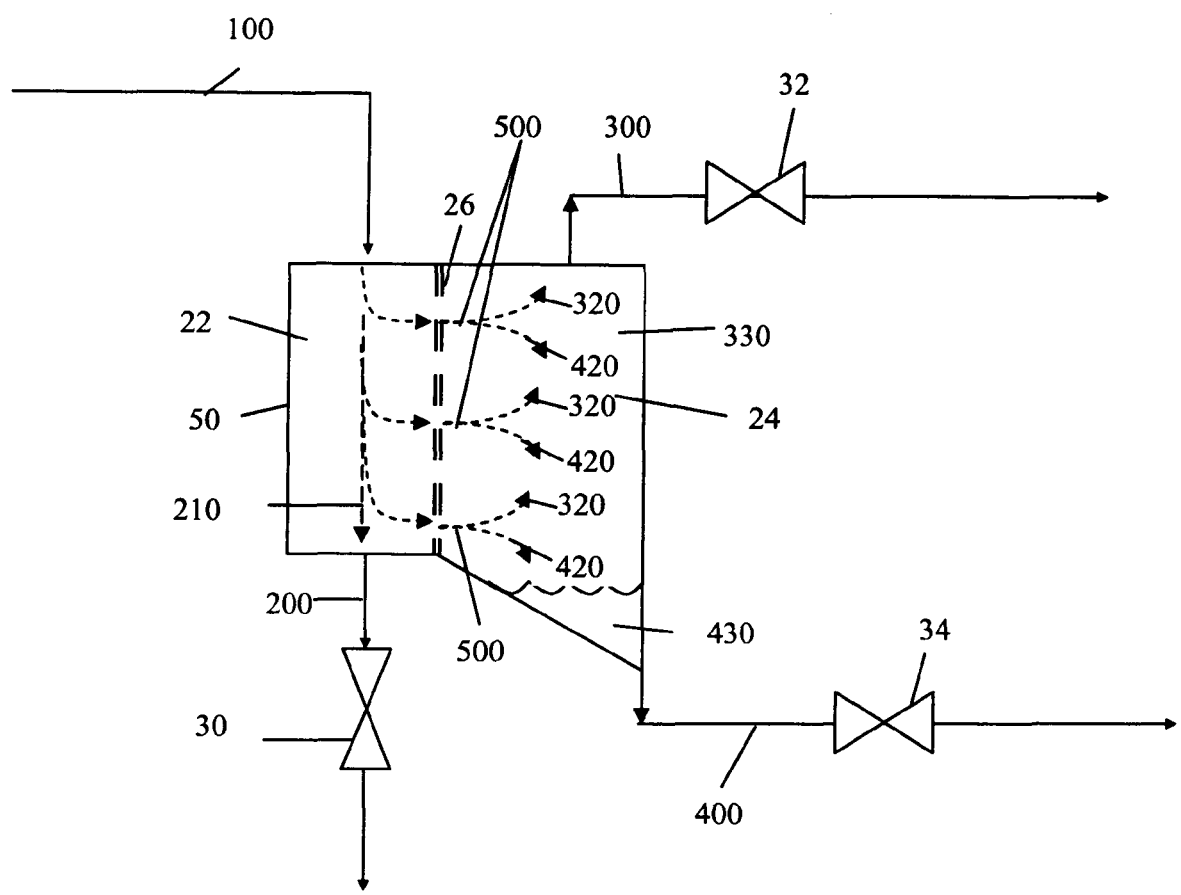
FIG. 2 is like FIG. 1 and includes also a representation of the flow through the apparatus of a multi-component feed stream and the various fractions formed therefrom.

Turning to FIG. 2, the feed stream 100 is introduced into the high-pressure chamber 22 of module 50 where it comes into contact with the porous separator 26. By virtue of the particular nature of the porous separator 26 and the pressure differential across the porous separator, a portion of at least two components of the feed stream 100 permeates the porous separator 26 and passes into the low-pressure chamber 24. The portion of the feed stream that passes through the porous separator constitutes a permeant fraction 500. The composition remaining in the high-pressure chamber 22 constitutes a retentate 210 which can be withdrawn from the high-pressure chamber through the conduit 200.

As the permeant fraction 500 passes through the porous separator 26 on its way to the low-pressure chamber 24, at least one of the components thereof undergoes a phase change, that is, the component changes in physical state. The pressure and temperature of the low-pressure chamber 24 may be maintained such that the permeant fraction 500 may exist in two phases, namely a liquid 420 phase and a vapor 320 phase, each differing in composition from the feed stream 100 and the permeant fraction 500. The compositions comprising the phases separate under gravity and form a liquid permeant fraction 430 and a vapor permeant fraction 330 which can be withdrawn from the low-pressure chamber 24 through conduits 400 and 300 respectively. In a preferred embodiment, the feed stream 100 is supplied continuously to the module 50 in which the conditions are maintained in a manner such that there is produced continuously a retentate 210, a vapor permeate fraction 330, and a liquid permeate fraction 430.

There follows a description of other aspects of the present development.

The feed stream comprises at least two components which are in the same fluid phase. It is believed that the permeant development will be used more widely to treat a feed stream which comprises at least two components which are in the liquid phase; it can be used, nevertheless, to treat a feed stream which comprises at least two components which are in the vapor phase. In either case, the "liquid" stream can contain one or more components which are in the vapor phase and the "vapor" stream can include one or more components which are in the liquid phase.

The components comprising the feed stream can include compounds which at ambient conditions are gases, but which by virtue of temperature and/or pressure conditions are in the liquid phase in the feed stream. Examples of compounds that can comprise components of the feed stream include: water, hydrogen, alkanes, alkenes, alkynes, cyocloakanes, aromatics, halides, halocarbons, alcohols, ethers, amines, nitrites, nitros, silanes, sulfides, sulfoxides, sulfones, thiols, carboyls, aldehydes, ketones, esters, amides, aldoses, ketoses and acetals. The components can comprise two or more of the aforementioned compounds along with one or more other compounds. Examples of specific combinations of compounds comprising the feed stream include: (A) ethanol and water (azeotropic and nonazeotropic); (B) carbon dioxide, methane, and propane; and (C) hydrogen, methane, and carbon dioxide. The feed stream can be at ambient temperature or at higher or lower temperature.

Components of the feed stream are separated by bringing the stream under pressure into contact with a porous separator. One or more components of the stream which do not pass through the porous separator comprise a retentate. Two or more components which pass through the porous separator comprise a permeant fraction which is the source of the liquid and vapor permeant fractions.

The porous separator of the present invention is a material that permits the selective permeation of at least two of the components of the stream in amounts different from their amounts in the feed stream. Variables of the process that are related to such permeation include, for example, the pressure differential across the porous separator, the sizes of the pores of the porous separator, and the molecular sizes of the compounds comprising the components.

The capacity of the permeant fraction to undergo a partial phase change (that is, the flashing or condensation of at least one, but fewer than all of the components) under certain defined conditions (for example, temperature, pressure, and ratio of components) can be determined by using commercially available process simulation software, such as ASPEN Plus®. This simulation software facilitates the engineering modeling of complex chemical processes and equipment, such as for example, distillation columns and chemical reactors. Typically, once a flowchart for a particular process has been developed and certain process variables have been defined, the software calculates the remaining process variable based upon natural laws, known formulas, an empirical data. For example, where a feed stream having a defined composition and pressure is provided, the software can predict which, if any, components of the feed stream will flash or condense after permeating a separator provided that the separator's selectivity for the feed components and the differential pressure across the separator are provided.

The selection of a porous separator is, therefore, dependent upon the particular composition of the feed stream as well as the desired compositions of the fraction streams, that is the material comprising the separator is selected based upon its particular selectivity for certain compounds. In this regard, selectivity refers to the porous separator's ability to prevent or restrict permeation of certain compounds, as well as to its ability to allow permeation of other compounds.

The pores comprising the porous separator include, for example, openings, for example microscopic openings, channels, and passages. The pores can be uniform in size or non-uniform in size. In one exemplary embodiment, the porous material can contain pores of a uniform size which function to separate molecules of different compounds based upon their sizes. For example, water molecules can be small enough to pass through particular-sized pores, whereas larger molecules of benzene would not be small enough to pass through the porous material.

In addition to providing a passageway for the aforementioned selective permeation of components comprising the feed stream, the nature of the pores of the porous material is such that they provide spaces within the separator in which at least a portion of a liquid component of the feed stream flashes to form a vapor or in which at least a portion of a vapor component of the feed stream condenses to form a liquid. Accordingly, the spaces accommodate the vapor and liquid permeant fractions, the source of which is the permeant fraction which flows through the porous separator.

Examples of porous materials comprising the separator are pore-containing membranes, molecular sieves and zeolite lattices, packed bed substrates, for example, resin beds and activated carbon beds, and nanotubes, for example, carbon nanotubes. The structure of porous separator can be uniform in nature, that is, comprised of but one type of porous material or it can be non-uniform and comprise a combination of two or more different porous materials, for example, the incorporation of a zeolite into the polymer matrix of a membrane.

Pore-containing membranes can be prepared, for example, in the form of flat sheets, tubes, capillaries and hollow fibers and may be constructed in a number of arrangements including, for example, a plate and frame, a spiral wound module, a hollow fiber module, and a tube-in-shell module. The pores of the membrane can be formed by perforation or by other means.

Examples of molecular sieves that can be used in the practice of the present invention include synthetic sieves that are formed from materials such as clays, silica gels and porous glasses and also natural sieves comprising, for example, mineral lime.

Natural or synthetic zeolites are examples of a type of molecular sieve that can be used in the practice of the present invention. Zeolites include inorganic porous materials, for example, aluminosilicate minerals, having a highly regular structure of pores and chambers that allows some molecules to pass through and prevent or deter others from passage or cause their break down.

Exemplary packed-bed substrates that can be used in the practice of the present invention are constructed of a hollow frame filled randomly with a granular absorbent material, for example, activated carbon or a resin. The packing has a relatively large surface area which functions to improve contact with the feed stream.

The porous structure can comprise nanotubes for use in a process which involves micro-scale separation.

The material of the porous separator may include properties in addition to porosity to achieve separation. For example, the porous separator can be chemically permeable (e.g., hydrophobic).

The porous separator may include also at least one permeable, nonporous material, that is, a material that does not have pores, but, nevertheless, allows the passage of at least some components of the feed stream through the separator via one or more processes, for example, diffusion, chemical affinity, electrochemical affinity, and electromagnetic fields. A combination of porous and nonporous materials can be used to achieve the effective separation of two or more components that would otherwise be difficult to separate using only a porous material.

The permeable, nonporous material may be, for example, integrated with the porous material, for example, to provide a mixture of the porous and nonporous materials, or positioned adjacent or contiguous to the separator in the form of one or more parallel plies. A ply can be arranged, for example, parallel to the inflow side of the separator, or parallel to the outflow side of the separator, and/or the separator can be sandwiched between two parallel plies of the permeable, nonporous material. Preferably, the permeable, nonporous material is positioned other than at the outflow side of the porous separator so that the phase change that occurs in at least one component of the permeant fraction is not impeded.

Examples of permeable, nonporous materials that can be used include membranes, for example, polymeric and ceramic membranes. Permeable, nonporous materials exists, for example, in the form of solids, liquids, and gels, and are of a nature that their association with the separator does not hinder the partial phase change of the permeant fraction as it passes through the separator.

The type of material comprising the porous separator and the permeable, nonporous material, if used, will depend on the components comprising the feed stream. It is within the level of skill of the art to select the material(s). For example, activated carbon filters are known for the selective separation of $CO_2$ from a $CO_2/CH_4$ mixture. As another example, zeolites are known for providing effective separation of gases, including the removal of $H_2O$, $CO_2$ and $SO_2$ from low-grade natural gas streams. One skilled in the art can determine the operating temperature and the pressure differential across the porous separator that is needed to achieve the desired separation.

The high-pressure chamber of the module is designed to accept the introduction of the feed stream, to permit the feed stream to contact the porous separator and to emit the retentate. The high-pressure chamber should include a control value or appropriate means for maintaining the pressure therein at its desired value.

The low-pressure chamber of the module is designed to receive the permeant fraction and to accommodate the partial flashing or condensation of the permeant fraction and also to emit both the vapor permeant fraction and the liquid permeant fraction. For example, in an embodiment in which flashing versus the low-pressure chamber is designed to allow for the rapid expansion of one or more components of the permeant fraction and, preferably, to promptly achieve and maintain a phase equilibrium. Other design factors include the provision of one or more control valves or other appropriate means to maintain the desired pressure in the low-pressure chamber.

Figure 3:
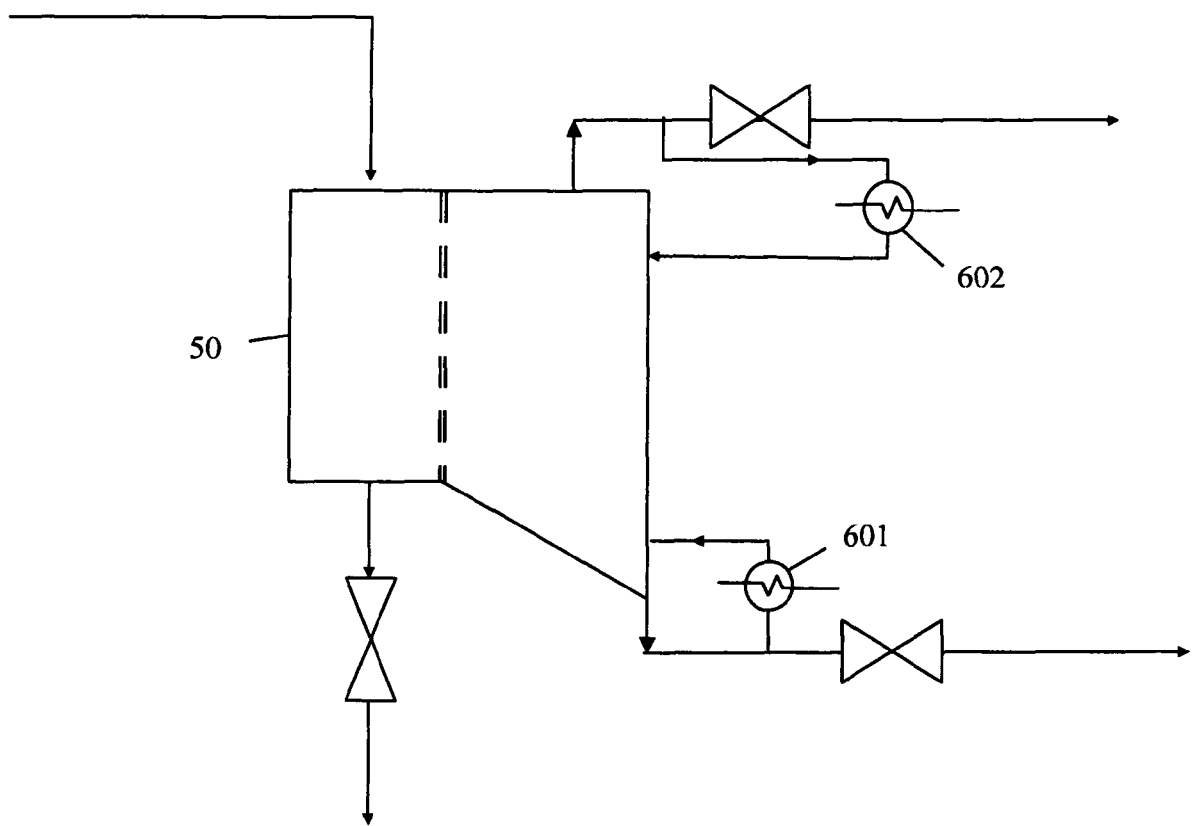
FIG. 3 shows an embodiment of an apparatus according to the present invention equipped with a reboiler and a condenser.

An advantage of the present invention over prior art processes which involve the conventional flashing or condensation as techniques of separation is that the present invention does not require the use of an external energy source. Flashing or condensation as it occurs in the present process can be achieved without use of a reboiler or condenser. There may be applications, however, in which a condenser or reboiler can be used. For example, the apparatus in FIG. 3 shows a module having both a reboiler 601 and a condenser 602.

In preferred embodiments, components of the feed stream are separated via a plurality of modules connected in series. Example No. 1 hereof is exemplary of the use of a plurality of modules and includes a description of FIG. 4.

In an apparatus that comprises a plurality of modules, the design of the modules may be substantially similar or may be different depending upon the separation of the fractions. For example, different types of porous separators may be used to consecutively achieve higher purities of the permeant fraction or to separate different components from the feed stream. Also, the capacity of separation of multiple modules can be achieved by using fewer modules of greater length.

EXAMPLES

Several examples of the separation of multi-component feed streams (in particular ternary and binary mixtures of components) according to the present invention were simulated. The results of the simulations demonstrate the effectiveness of the present method and apparatus to separate the components of the mixtures based upon the conditions described. Each of Example Nos. 1 to 4 below involve the simulation of a process for separating a multi-component feed stream into a retentate, a permeant vapor fraction, and a permeant liquid fraction. The simulations were conducted using the ASPEN Plus® program, a commercially available simulation software package. The simulations involve selecting, as simulation inputs, predetermined conditions which are associated with the process described in each of the examples hereof. Based on the information represented by the simulation inputs, the ASPEN Plus® program generates certain simulation outputs that include numerical values for certain physical properties of the components, for example, the composition of the retentate and the vapor and liquid permeant fractions, which is evidence that the apparatus is effective in separating the feed stream into the various fractions.

The predetermined conditions include, for example, the composition of the feed stream and the temperature, pressure, and flow rate thereof; the pressure on the inflow side of the porous separator; the pressure on the outflow side of the porous separator; the pressure and temperature of the retentate; the number of modules for use in the process; whether a reboiler and/or condenser is utilized and, if so, its capacity for doing work; and the amount of each component that flows through the porous separator. The last-mentioned predetermined condition can be determined by a simulation input that identifies the volumetric amount of the feed stream that permeates the porous separator or the identification of the amount of each component that permeates the separator. Based upon the aforementioned predetermined conditions, the following exemplary outputs are generated by the use of the program: the composition and flow rate of the retentate; and the temperature, flow rate, and composition of each of the vapor permeant fraction and the liquid permeant fraction.

The apparatus for use in the processes described in the examples comprises a plurality of modules which are positioned in series and in which components of the feed streams being treated are separated. Each module comprises a porous separator which is positioned between a high-pressure chamber and a low-pressure chamber, an inlet in the high-pressure chamber for the feed stream, an outlet in the high-pressure chamber for the retentate which is formed in that chamber, an outlet in the low-pressure chamber for the liquid permeant fraction, and an outlet in the low-pressure chamber for the vapor permeant fraction.

The multi-component feed stream for each of the examples comprises a predetermined mixture of particular compounds in defined concentrations and having a defined flow rate and temperature. For example, in Example No. 1, the predetermined feed stream for the first module comprises a ternary mixture of $CO_2$, $CH_4$, and $C_3H_8$ having a mole fraction of 0.90, 0.05, and 0.05, respectively, a flow rate of 100 kg/hr, and a temperature of $-32°$ F.

Each of the examples includes the use of a porous separator with predetermined characteristics which control, for example, the proportion of each component of the feed stream that is permitted to flow through the separator. With this information, one skilled in the art can determine the nature of the porous separator that can be used in any particular application. For example, it is known that cross-linked poly (vinyl alcohol) or a poly(vinyl alcohol)/amine polymer with angstrom-sized silicon dioxide particles dispersed throughout a membrane matrix and crosslinked using either maleic acid or gluteraldehyde can be used as a porous separator to separate an azeotropic mixture of isopropyl alcohol and water (see, for example, Example No. 4). Such materials or other types of porous materials, or combinations of two or more of such materials, can be used in the practice of the present invention, provided that the particular material(s) that is used is compatible with other aspects of the process.

The pressure on each of the inflow side and outflow side of the porous separator was also predetermined; this, in turn, defines the pressure differential across the porous separator.

Based on the predetermined conditions referred to in each of the examples, the simulation outputs which are generated by the aforementioned computer program identify for each of the examples information respecting the composition, pressure, temperature, and flow rates, of the involved compositions, namely the retentate, and the liquid and vapor permeant fractions. The information is reported in the tables that accompany the examples.

Example No. 1

Figure 4:
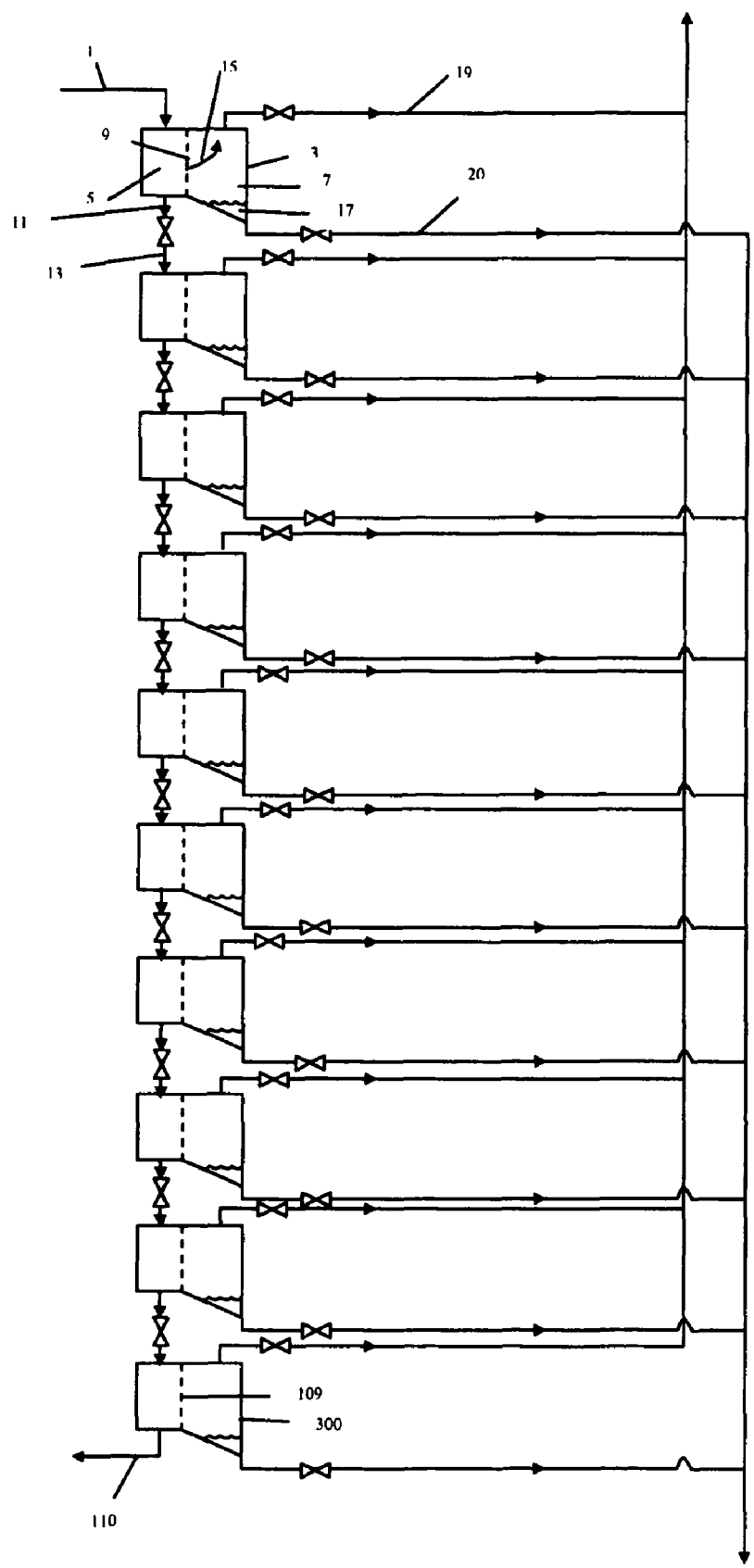
FIG. 4 shows an embodiment of an apparatus according to the present invention having multiple modules in which multi-component feed streams are separated into fractions.

Example No. 1 is illustrative of a continuous process for separating methane from a pressurized and cooled liquid feed stream comprising liquid carbon dioxide, propane, and methane (all components of the stream are in the liquid state). The apparatus for use in the separation comprises ten modules in series. No external energy source is applied to the apparatus (that is, the apparatus does not include a reboiler or condenser). The apparatus for use in this example is shown in FIG. 4.

A multi-component feed stream 1 comprising liquid carbon dioxide, methane, and propane in the proportions identified in Table 1 below is supplied to the high-pressure chamber 5 of the first module 3 at a rate of 100 kg/hr, a pressure of 315 psia, and a temperature of $-32°$ F. (all predetermined). The low-pressure chamber 7 of module 3 is maintained at a predetermined pressure of 55 psia. Accordingly, the pressure differential across the porous separator 9 of this module is 260 psi.

As the feed stream is introduced into the high-pressure chamber 5 of the first module 3, it contacts the inflow side of the porous separator 9. In this simulation, it was predetermined that 10 vol. % of the feed stream permeates the separator. With respect to the feed stream, the permeant fraction (not shown) which flows through the separator is rich in methane, as indicated in Table 1. Accordingly, there is formed, relative to the feed stream, a retentate 11 that is rich in carbon dioxide and propane.

Inasmuch as the retentate 11 contains residual methane, the retentate is subjected to treatment to recover additional amounts of the methane. Accordingly, the retentate 11 of the first module becomes the feed stream 13 of the second module. (And in turn, the retentate formed in the second module becomes the feed stream for the third module and so on for the remaining modules.) Under the predetermined conditions of the process, the feed stream comprising the retentate undergoes a pressure drop relative to the feed stream that enters the first module and is accompanied by a drop in temperature. The pressure drop is 25 psi which means that the feed stream entering the second module has a pressure of 290 psia. (Each of the feed streams formed from retentates in succeeding modules likewise undergoes a pressure drop of 25 psi, with the stream comprising the retentate 110 of the last module being discharged therefrom at a pressure of 65 psia [315 psia original pressure-(10 modules) (25 psi pressure drop/module)= 65 psia]. For the simulation, this pressure drop is reflected only in the egressing stream of retentate, that is, the pressure inside each of the high-pressure chambers is assumed to be uniform. The composition of the retentate 110 that is recovered from the tenth module and other characteristics thereof are reported in Table 1 below.

The permeant fraction which is formed in the first module 3 from the liquid feed stream 1 and which passes through the porous separator 9 does so under conditions which are effective to cause substantially all of the liquid methane to flash, that is, to form a vapor permeant fraction 15; the conditions are effective to maintain the carbon dioxide and propane in their liquid states; as such, they comprise a liquid permeant fraction 17. The vapor permeant fraction 15 is separated from the liquid permeant fraction 17 by gravitational force and is removed from the low-pressure chamber of the first module 3 through conduit 19. Similarly, the liquid permeant fraction 17 is removed from the low-pressure chamber of the first module through conduit 20.

In this example, the low-pressure chamber of each module is maintained at 55 psia. Thus, the pressure differential across the porous separator 9 decreases sequentially in each module because the pressure in each of the high-pressure chambers decreases sequentially. The pressure differential across the porous separator 109 in the last module 300 is 10 psi (the pressure of the high-pressure chamber of module 300 is 65 psia and that of the low-pressure chamber is 55 psia). These conditions are effective to cause flashing of the methane of the permeant fraction in each of the modules.

Each of the vapor permeant fractions that are withdrawn from the modules is combined with the other vapor permeant fractions to form a composition comprising methane in a greater proportion than that present in the original feed stream. Likewise, each of the liquid permeant fractions that is recovered from its respective module is combined with the other liquid permeant fractions to form a composition that is methane poor relative to the proportion of methane in the original feed stream. The liquid composition of the "final" retentate 110 (that is, the retentate egressing from the last module 300) and the compositions of the combined liquid permeant fractions and the combined vapor permeant fractions and other characteristics of the retentate and permeant fractions are reported in Table 1 below.

for use in the separation is equipped with a reboiler and condenser (neither of which is shown in FIG. 4).

More specifically, a second simulation was performed using all of the predetermined conditions defined in Example No. 1, but with the predetermined conditions that a partial reboiler and a partial condenser are used to further enrich the vapor permeant fraction with the relatively low-boiling methane and to further remove methane from the liquid permeant fraction. The liquid permeant fractions exiting each module are fed into separate partial reboilers which together have a cumulative capacity for work of 5100 Btu/hr and which heat and at least partially vaporize their respective liquid permeant fractions. Since the methane is vaporized more readily compared to the propane or carbon dioxide, the vaporized portions of these fractions are rich in methane, relative to the unvaporized portions. The vaporized portions are transferred to the low-pressure chamber of their respective modules, while the "unvaporized" portions of the liquid permeant fractions, which are substantially free of methane, are collected.

Similarly, the vapor permeant fractions exiting each module are fed into separate partial condensers which have a cumulative capacity for work of −2850 Btu/hr and which cool and at least partially condense the vapor permeant fractions. Since the propane and carbon dioxide condense more readily compared to the methane, the condensed portions of these fractions are rich in propane and carbon dioxide, relative to the "uncondensed" portions. The condensed portions are transferred to the low-pressure chambers of the modules, while the uncondensed portions, which are rich in methane, are collected.

Each of the vapor permeant fractions that are withdrawn from the modules is combined with the other vapor permeant fractions to form a composition comprising methane in a greater proportion than that present in the original feed

TABLE 1

| | Units | Feed | Final Retentate | Combined Liquid Permeant Fractions | Combined Vapor Permeant Fractions |
|---|---|---|---|---|---|
| Pressure | psia | 315 | 65 | 55 | 55 |
| Temperature | deg. F. | −32 | −75.8 | −82.6 | −94.2 |
| Flow | kg/hr | 100 | 36 | 47.2 | 16.8 |
| Composition: | | | | | |
| $CO_2$ | Mole fraction | 0.900 | 0.931 | 0.955 | 0.713 |
| | Mass fraction | 0.929 | 0.931 | 0.955 | 0.853 |
| $CH_4$ | Mole fraction | 0.050 | $4.5 \times 10^{-6}$ | $3.0 \times 10^{-5}$ | 0.258 |
| | Mass fraction | 0.019 | $1.6 \times 10^{-6}$ | $2.8 \times 10^{-5}$ | 0.112 |
| $C_3H_8$ | Mole fraction | 0.050 | 0.069 | 0.045 | 0.029 |
| | Mass fraction | 0.052 | 0.069 | 0.045 | 0.035 |

As can be seen from this data, the use of the process of the present invention is effective in removing substantially all of the methane from the original feed stream, that is, the use of the process produces a final retentate and a liquid permeant fraction that are essentially free of methane.

Example No. 2

The process of Example No. 2 is similar to the process described in Example No. 1, but differs in that the apparatus stream. Likewise, each of the liquid permeant fractions that is recovered from its respective module is combined with the other liquid permeant fractions to form a composition that is methane-poor relative to the proportion of methane in the original feed stream. The liquid composition of the "final" retentate (that is, the retentate egressing from the last module) and the compositions of the combined liquid permeant fractions and the combined vapor permeant fractions and other characteristics of the retentate and permeant fractions are reported in Table 2 below.

TABLE 2

|  | Units | Feed | Final Retentate | Combined Liquid Permeant Fractions | Combined Vapor Permeant Fractions |
| --- | --- | --- | --- | --- | --- |
| Pressure | psia | 315 | 65 | 55 | 55 |
| Temperature | deg. F. | −32 | −75.8 | −82.5 | −161.5 |
| Flow | kg/hr | 100 | 36 | 61.7 | 2.3 |
| Composition: |  |  |  |  |  |
| $CO_2$ | Mole fraction | 0.900 | 0.931 | 0.957 | 0.071 |
|  | Mass fraction | 0.929 | 0.932 | 0.957 | 0.172 |
| $CH_4$ | Mole fraction | 0.050 | $4.5 \times 10^{-6}$ | $8.0 \times 10^{-8}$ | 0.925 |
|  | Mass fraction | 0.019 | $5.47 \times 10^{-7}$ | $2.9 \times 10^{-8}$ | 0.818 |
| $C_3H_8$ | Mole fraction | 0.050 | 0.069 | 0.043 | 0.004 |
|  | Mass fraction | 0.052 | 0.068 | 0.043 | 0.010 |

As can be seen from the above data, the present process removes effectively substantially all of the methane from the original feed stream and forms a retentate and liquid permeant fraction essentially free of methane and a vapor permeant fraction rich in methane. Compared to the results in Example No. 1 (which describes a process that does not include use of a reboiler or condenser), the present process forms a vapor permeant that contains a higher proportion of methane and a substantially lower proportion of carbon dioxide and propane and a liquid permeant fraction having a lower proportion of methane.

Example No. 3

Example No. 3 is exemplary of a process that is used, in accordance with the present invention, to separate $CO_2$ from a predetermined gaseous mixture of $CO_2$, $CH_4$, and $H_2$. The simulation is similar to that of Example No. 1, except as noted hereafter. In addition to the treatment of a different feed stream, (A) the mixture comprises a vapor;
(B) the predetermined pressure gradient across the each porous separator is 260 psi;
(C) the predetermined pressure of the retentate which exists in the last module of the apparatus is the same as the pressure of the feed stream which enters the first module, that is, the pressure of the feed stream for each module is the same as the pressure of the retentate for that module;
(D) the predetermined molar ratio of $H_2/CO_2$ permeating each of the porous separators is 1.43:1;
(E) the predetermined ratio of $CH_4/CO_2$ permeating each of the porous separators is 0.078:1; and
(F) the predetermined amount of feed stream which permeates each porous separator is 0.2 lb-mol/hr.

In this example, a gaseous feed stream rich in methane, but containing also carbon dioxide and hydrogen, is supplied to the high-pressure chamber of the first module at a rate of 100 kg/hr, a pressure of 315 psia, and a temperature of −32° F. Since the temperature of the feed stream is higher than the dew point of the mixture (that is, about −111° F.), the mixture is in its vapor state. As the feed stream contacts the porous separators of the various modules, essentially all of the hydrogen and carbon dioxide, along with a portion of the methane, permeate the porous separators to form a retentate rich in methane. The permeant fraction is are subjected to conditions such that carbon dioxide condenses and separates from methane.

The results of this simulation are presented in Table 3. Each of the vapor permeant fractions that are withdrawn from the modules is combined to form a composition comprising methane and hydrogen in a greater proportion than that present in the original feed stream. Likewise, each of the liquid permeant fractions that are recovered from their respective modules is combined to form a composition that is rich in carbon dioxide relative to the original feed stream. The liquid composition of the "final" retentate (that is, the retentate egressing from the last module) and the compositions of the combined liquid permeant fractions and the combined vapor permeant fractions and other characteristics of the retentate and permeant fractions are reported in Table 3 below.

TABLE 3

|  | Units | Feed | Final Retentate | Combined Liquid Permeant Fractions | Combined Vapor Permeant Fractions |
| --- | --- | --- | --- | --- | --- |
| Pressure | psia | 315 | 315 | 55 | 55 |
| Temperature | deg. F. | −32 | −72.8 | −82.5 | −169.6 |
| Flow | kg/hr | 100 | 36 | 61.8 | 2.2 |
| Composition: |  |  |  |  |  |
| $CO_2$ | Mole fraction | 0.100 | about 0 | 0.995 | 0.057 |
|  | Mass fraction | 0.235 | about 0 | 0.980 | 0.146 |
| $CH_4$ | Mole fraction | 0.890 | about 1 | 0.005 | 0.908 |
|  | Mass fraction | 0.764 | about 1 | 0.020 | 0.850 |
| $H_2$ | Mole fraction | 0.010 | 0 | 0.000 | 0.035 |
|  | Mass fraction | 0.010 | 0 | 0.000 | 0.004 |

As can be seen from the above data, the process of Example No. 3 is effective in separating a three-component feed stream into a retentates rich in methane and substantially free of carbon dioxide and hydrogen, a vapor permeant fraction that is rich in methane, and a liquid permeant fraction that is rich in carbon dioxide.

Example No. 4

Example No. 4 illustrates the use of the present invention to separate an azeotropic mixture of isopropanol and water. The simulation is similar to that of Example No. 1, except for the predetermined conditions noted hereafter. In addition to the treatment of a predetermined different feed stream, (A) the process included the use of fourteen modules that were connected in series;

(B) the feed stream pressure for each module is the same as the retentate pressure for that module;

(C) the pressure differential across each porous separator is 99.9 psi;

(D) the amount of the feed stream which permeates each porous separator is 0.1 lb-mol/hr; and (E) the molar ratio of isopropanol/water permeating each of the porous separators is 30:1.

In this example, an azeotrope mixture of water and isopropanol is supplied to the high-pressure chambers of the modules at the concentrations specified in Table 4 and at a pressure of 100 psia and a temperature of 291° F. As the feed stream enters each module it contacts the inflow side of the porous separator of the module. As set forth above, the ratio of isopropanol to water that permeates the separator is 30:1. By increasing the concentration of isopropanol in the premeant fraction relative to the azeotropic feed stream, the composition of the permeant fractions ceases to be azeotropic. As a result, the premeant fraction flashes to form a vapor premeant fraction rich in isopropanol.

Removing a portion of the isopropanol from the feed stream produces also a retentate that is rich in water and that is not azeotropic. As per the predetermined conditions, the pressure of the retentate flowing from the high pressure chamber of the module is the same as the pressure of the corresponding feed stream that flows into the next module. Thus, theoretically there is no pressure drop between the original feed stream and the retentate that exits the last module.

The results of this simulation are presented in Table 4. The liquid permeant fraction parameters reported below represent the aggregate value of the individual liquid permeant fractions produced by each module. Likewise, the vapor permeant fraction parameters reported below represent the aggregate value of the individual vapor permeant fractions produced by each module.

TABLE 4

| | Units | Feed | Final Retentate | Combined Liquid Permeant Fractions | Combined Vapor Permeant Fractions |
|---|---|---|---|---|---|
| Pressure | psia | 100 | 100 | 0.1 | 0.1 |
| Temperature | deg. F. | 291 | 291 | 3.8 | 1.1 |
| Flow | kg/hr | 100 | 99.8 | 0.1 | 0.1 |
| Composition: | | | | | |
| $H_2O$ | Mole fraction | 0.500 | 0.943 | 0.331 | 0.043 |
| | Mass fraction | 0.231 | 0.832 | 0.129 | 0.013 |
| Isopropanol | Mole fraction | 0.500 | 0.057 | 0.669 | 0.957 |
| | Mass fraction | 0.769 | 0.168 | 0.871 | 0.987 |

As can be seen from the above data, the process of Example No. 4 can be used to effectively break the water/isopropanol azeotrope and to produce a vapor permeant fraction rich in isopropanol and a liquid permeant fraction rich in water.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. A process for separating a multi-component feed stream into fractions comprising the steps of:
   (a) providing a feed stream having at least two fluid components in the same phase;
   (b) providing a porous separator having an inflow side and an outflow side;
   (c) maintaining across the porous separator a pressure differential comprising a relatively high pressure on the inflow side of the separator and a relatively low pressure on the outflow side of the separator;
   (d) bringing the feed stream at the relatively high pressure into contact with the inflow side of the separator and under conditions which effect separation of the components of the feed stream into a retentate which forms on the inflow side of the separator and a permeant fraction, wherein the permeant fraction (i) includes more than one component of the feed stream in a proportion different from that of the feed stream being treated; and (ii) is the source of a liquid permeate fraction and vapor permeate fraction as the permeant fraction passes through the porous separator; and
   (e) recovering each of said retentate, liquid permeate fraction, and vapor permeate fraction:
       wherein said porous separator comprises a membrane containing porous materials within membrane matrix.

2. The process of claim 1 wherein said two components of said feed stream are liquid.

3. The process of claim 1 wherein said two components of said feed stream are vapor.

4. The process of claim 1 wherein said feed stream comprises three or more components.

5. The process of claim 1 wherein said feed stream is azeotropic and said liquid and vapor permeate fractions are nonazeotropic.

6. The process of claim 1 wherein steps (a) through (e) occur in the absence of an input of energy.

7. The process of claim 1 wherein steps (a) through (e) occur in the presence of an input of energy.

8. The process of claim 1 wherein said steps (a) through (e) are repeated a predefined number of times.

* * * * *